US012061588B1

(12) United States Patent
Singh et al.

(10) Patent No.: US 12,061,588 B1
(45) Date of Patent: Aug. 13, 2024

(54) SYSTEMS AND METHODS FOR AUTOMATICALLY SELECTING AND CREATING SECONDARY INDEXES

(71) Applicant: Honeywell International Inc., Charlotte, NC (US)

(72) Inventors: Ankit Singh, Apex, NC (US); Lakshminarayana Paila, Knoxville, TN (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/298,755

(22) Filed: Apr. 11, 2023

(51) Int. Cl.
  *G06F 16/22* (2019.01)
  *G06F 16/903* (2019.01)
(52) U.S. Cl.
  CPC .... *G06F 16/2282* (2019.01); *G06F 16/90335* (2019.01)
(58) Field of Classification Search
  CPC .................. G06F 16/2282; G06F 16/90335
  See application file for complete search history.

(56) References Cited

U.S. PATENT DOCUMENTS

| | | | |
|---|---|---|---|
| 10,740,312 B1* | 8/2020 | Mritunjai | G06F 16/2272 |
| 10,853,182 B1* | 12/2020 | Vig | G06F 16/23 |
| 2007/0168400 A1* | 7/2007 | Lee | G06F 16/328 |
| 2014/0000442 A1* | 1/2014 | Miyajima | G10H 1/0008 |
| | | | 84/609 |
| 2018/0157737 A1* | 6/2018 | Munk | G06F 16/316 |
| 2020/0074565 A1* | 3/2020 | Dotter | G06F 16/907 |
| 2020/0334297 A1* | 10/2020 | Kussmaul | G06F 16/9035 |
| 2022/0180056 A1* | 6/2022 | Hong | G06F 9/547 |
| 2023/0027188 A1* | 1/2023 | Sridhar | G06F 3/04817 |
| 2023/0418789 A1* | 12/2023 | Shilane | G06F 16/156 |

* cited by examiner

*Primary Examiner* — Cam Y T Truong
(74) *Attorney, Agent, or Firm* — Alston & Bird LLP

(57) ABSTRACT

A method of querying a set of raw data includes: receiving raw data; generating a base table having a primary key including a partition key and a sort key; generating a first set of local secondary indexes for the base table, the specific local secondary index sort key being a different one of the plurality of attributes than the sort key of the base table; developing one or more usage factors for each of the one or more local secondary indexes of the base table; receiving a second set of raw data having a plurality of attributes; generating a second base table including the second set of raw data; and generating a second set of local secondary indexes for the second base table based on the usage factors associated with the set of local secondary indexes.

17 Claims, 6 Drawing Sheets

AFTER STUDYING LSI'S USAGE FROM PHASE 1, NEW LSI'S GET CREATED IN THE SECOND PHASE

"Pharmaceutical_Product_Discussion_Index"

| ForumName 302 | LastPostDateTime 304 | Subject 306 | Replies 308 |
|---|---|---|---|
| "Product_1" | "2018-01-03:09:21:11" | "Quality Assurance Issues" | 9 |
| "Product_1" | "2018-01-22:23:18:01" | "Internal Discussion" | 3 |
| "Product_1" | "2018-02-31:13:14:21" | "Supply Chain" | 4 |
| "Product_1" | "2018-03-15:17:24:31" | "Global Operations" | 12 |
| "Product_2" | "2018-01-18:07:33:42" | "Quality Assurance Issues" | 0 |
| "Product_2" | "2018-02-12:11:07:56" | "Internal Discussion" | 18 |
| "Product_3" | "2018-01-19:01:13:24" | "Supply Chain" | 3 |
| "Product_3" | "2018-02-22:12:19:44" | "Quality Assurance Issues" | 5 |
| "Product_3" | "2018-03-11:06:53:00" | "Internal Discussion" | 11 |

FIG. 3

SYSTEMS AND METHODS FOR AUTOMATICALLY SELECTING AND CREATING SECONDARY INDEXES

TECHNICAL FIELD

The present disclosure relates to automatically selecting and generating search parameters for querying one or more tables or other collections of data, and more specifically, to automatically selecting and generating local and global secondary indexes.

BACKGROUND

When document databases are generated, they may be generated with one or more keys for searching the database efficiently. Such keys can include, for example, a primary key, which may include only a partition key (i.e., a simple primary key) or may include a partition key and a sort key (i.e., be a composite primary key). However, the use of a primary key alone may not provide the most efficient data lookup capabilities for all databases. Organizations may benefit from a capability to query and/or scan databases using additional keys.

One such organization may be a pharmaceutical company, which may maintain vast quantities of data in order to generate periodic quality review reports and other products. As one example of reports requiring expansive amounts of data, a pharmaceutical company may be required to produce an Annual Product Quality Review (APQR) report that details quality information associated with its products. Generation of such reports may benefit from a capability to quickly sort and access data related to files in a document management system, for example, in order to quickly access previously generated data in order to generate reports. One or more secondary indexes may provide better searching and query capabilities of the documents and other data in the database, thus making them more accessible. Generating an APQR is, of course, merely one application of the features described herein below. Accordingly, systems and methods for automatically selecting and creating secondary indexes may be required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method of querying a set of raw data using automatically generated local secondary indexes includes: receiving raw data having a plurality of attributes; generating a base table including the raw data, the base table having a primary key including a partition key and a sort key, each of the partition key and the sort key a different one of the plurality of attributes; generating a first set of local secondary indexes for the base table, each of the local secondary indexes having the partition key and a specific local secondary index sort key, the specific local secondary index sort key being a different one of the plurality of attributes than the sort key of the base table; developing one or more usage factors for each of the one or more local secondary indexes of the base table, the usage factors developed over a period of time and based on user interaction with the data in the base table; receiving a second set of raw data having a plurality of attributes; generating a second base table including the second set of raw data; and generating a second set of local secondary indexes for the second base table based on the usage factors associated with the set of local secondary indexes.

In another embodiment, a method of creating a local secondary index based on usage factors includes receiving raw data having a plurality of attributes; generating a base table including the raw data, the base table having a primary key including a partition key and a sort key, each of the partition key and the sort key a different one of the plurality of attributes; generating a set of local secondary indexes for the base table, each of the local secondary indexes having the partition key and a specific local secondary index sort key, the specific local secondary index sort key being a different one of the plurality of attributes than the sort key of the base table; developing one or more usage factors for each of the one or more local secondary indexes of the base table, the usage factors developed over a period of time and based on user interaction with the data in the base table; receiving a second set of raw data having a plurality of attributes; generating a second base table including the second set of raw data; and changing the set of local secondary indexes for the second base table based on the usage factors associated with the set of local secondary indexes.

In yet another embodiment, a system for generating and automatically updating local secondary indexes includes: an input device; a processor; and a memory. The memory is communicatively coupled to the processor and includes one or more non-transitory, processor-readable instructions, that when executed by the processor cause the system to: receive raw data having a plurality of attributes; generate a base table including the raw data, the base table having a primary key including a partition key and a sort key, each of the partition key and the sort key a different one of the plurality of attributes; generate a set of local secondary indexes for the base table, each of the local secondary indexes having the partition key and a specific local secondary index sort key, the specific local secondary index sort key being a different one of the plurality of attributes than the sort key of the base table; develop one or more usage factors for each of the one or more local secondary indexes of the base table, the usage factors developed over a period of time and based on user interaction with the data in the base table; receive a second set of raw data having a plurality of attributes; generate a second base table including the second set of raw data; and change the set of local secondary indexes for the second base table based on the usage factors associated with the set of local secondary indexes.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 3 illustrates various aspects of the exemplary computing environment of FIG. 1.

DETAILED DESCRIPTION

Systems and methods described herein relate to document query, and especially the query of databases (e.g. NoSQL databases, etc.) which may be maintained using database management systems (DMS) or similar database management tools. Such systems may record and store vast amounts of document data and metadata while providing tools to quickly and efficiently recall the documents or data. Such tools may enable, for example, operating and scaling distributed databases with capabilities such as, for example, hardware provisioning, setup and configuration, replication, software patching, and cluster scaling and may have one or more security features, such as, for example, encryption (e.g., encryption at rest) and other security features.

The following disclosure provides one or more systems and methods for querying such databases. In some instances, querying a database using only its primary key may suffice. However, one or more alternative keys could be useful in certain circumstances, for example, if an organization has multiple subordinate organizations, each of which queries data in a specific manner. Further, the most efficient or most useful manner for querying an index may change over time and search functions may need to be routinely optimized. The following detailed descripting provides systems and methods for creating one or more local and/or global secondary indexes to optimize search results for any particular query.

Figure 1:
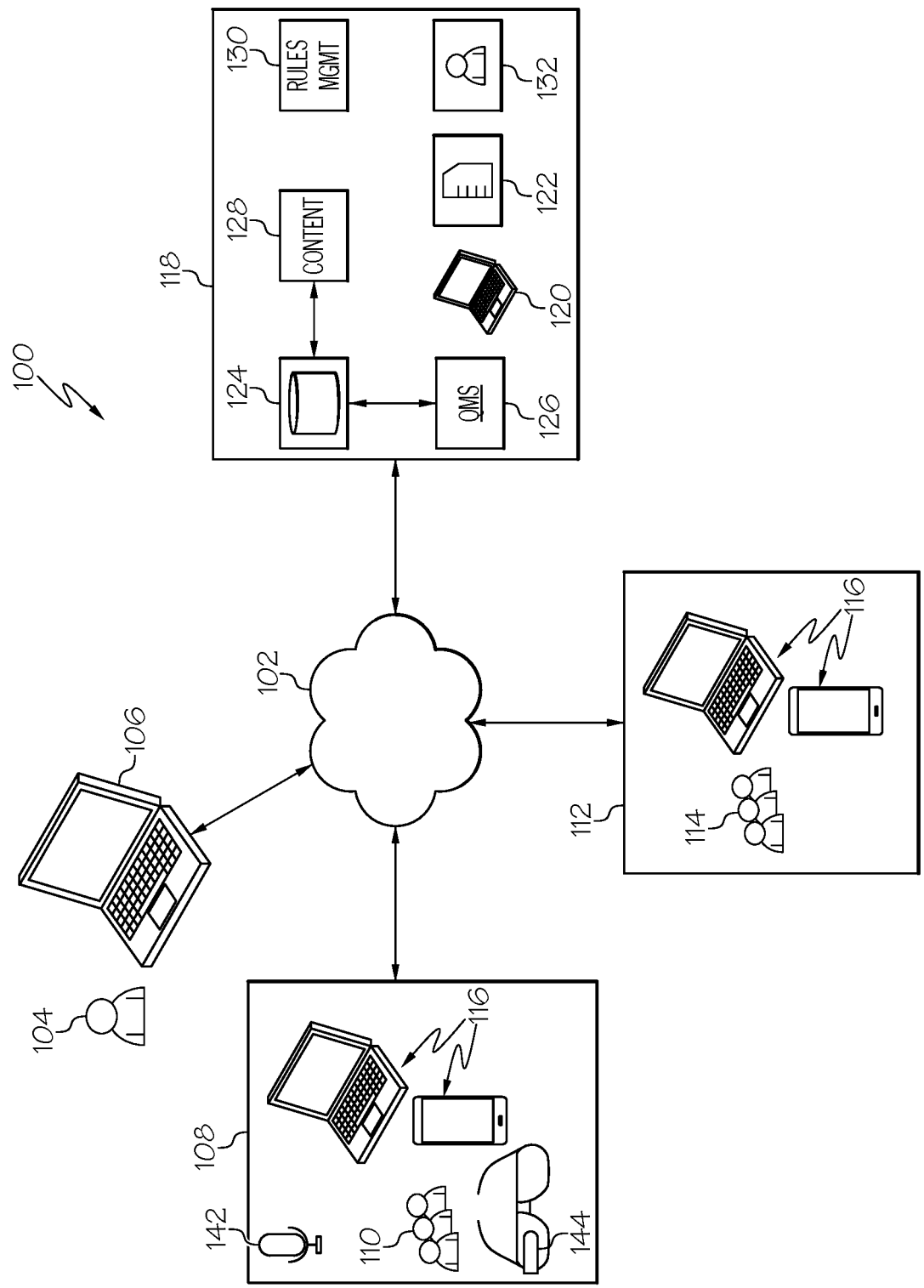
FIG. 1 illustrates an exemplary computing environment for implementing one or more of the systems and methods described herein.

Referring to FIG. 1, a system 100 for automatically selecting and creating secondary indexes is shown. The system 100 may include a plurality of nodes comprising one or more processing devices (e.g., personal computers, computer networks, personal devices, device networks, etc.) communicatively coupled to a network 102 via one or more communication interfaces (e.g., modem, router, transceiver, etc.) One or more users may be connected to the network 102. For example, an admin user 104 may connect to the network through an admin device 106. In embodiments, users may be grouped according to one or more similar characteristics. For example, the users may be grouped according to a department of the users, a primary geographical location of the users, a primary language of the users, etc. In some embodiments, a first grouping 108 may include one or more users 110 and a second grouping 112 may include one or more users 114. The users may connect to the network 102 via user devices 116. The users may each have individual access permissions to access various documents, files, and data within the system 100 and each may have various methods for searching and querying data as will be described in greater detail herein. In some embodiments, the first grouping 108 and the second grouping 112 may be, for example, tenants accessing a multi-tenant database (e.g., a file management system) for which each group it may be efficient to create similar and/or common features. For example, users may share a common set of global search indexes, local search indexes, access permissions, certifications, etc. In some embodiments, the first grouping 108 and the second grouping 112 may be various departments or sectors of a singularly-controlled organization (e.g., a company, firm, etc.) for whom it may be efficient to create similar and/or common features. These two types of groups are merely non-limiting examples and it is to be understood that the first grouping 108 and the second grouping 112 may have any relationship within the organization and that there may be more or fewer groups of individuals within the organization with similar or various characteristics.

Still referring to FIG. 1, a file management system may include or be comprised on a document management server (DMS) 118, which DMS 118 may be communicatively coupled to the network 102. The DMS 118 may comprise one or more processing devices 120, one or more memory devices 122, one or more databases 124 (or repositories, content repositories, etc.), a quality management solution (QMS) module 126, a content module 128, a rules management module 130, and a user profile module 132. In some embodiments, one or more of the users 110 may provide inputs to the system 100 via one or more input devices. For example, the users 110 may provide input to the system 100 via an audible input 142 and/or a hands-free input 144. The audible input 142 may be communicatively coupled to, for example, software for understanding one or more speech inputs and the hands-free input 144 may be capable of receiving and providing to the system 100 one or more inputs based on visual and/or audible data (e.g., by scanning a QR code, etc.)

The network 102 may be used to transmit data from the various data processing devices to the server (e.g., a computer of any appropriate configuration) in an appropriate manner. For instance, the data processing device(s) and the server may communicate over a local area computer network (LAN) or a public computer network (e.g., the Internet). In some embodiments, the network 102 may be a private LAN and may be separated from the public Internet by, for example, a firewall. The information associated with generating one or more local and/or global secondary indexes may be transmitted from the server to one or more of the nodes in any appropriate manner. For instance, the server and a node (e.g., a personal computer; a desktop computer; a laptop computer; a "dumb" terminal) at any location connected to the network may communicate over a computer network, such as a public computer network (e.g., the Internet). A web application may be used to view search results as well.

The one or more processors 120 may communicatively couple with the one or more memory devices to perform one or more of the computer-based methods described herein. The DMS 118 may enable users to manage one or more types of files such as, for example, text-based files, image-based files, charts, presentations, images, videos, sounds, and other types of files. The DMS 118 may present one or more interfaces including a query function, allowing users to search a connected database (e.g., an open source, distributed search and analytics tool) and may provide search results using a search engine that can conduct a search of the relevant databases communicatively coupled to a device of the user. In some embodiments, the relevant databases may be automatically selected for a given search based on a profile of the user (as determined, for example, with the user profile module 132). The automatically selected databases may be a default setting based on, for example, a profile of the user (e.g., to which department a user identity is assigned) and the selected databases may be configurable such that a user can decide which databases the user's queries search.

The QMS 126 may track and control, for example, a web of quality events, any one of which could trigger numerous parallel or downstream actions. Quality management may impact every area of the business, and as such quality data may be input and fed from various aspects of the network 102. The QMS 126 may, for example, reduce the time and risk of error associated with manual process reporting, provide consistent change control processes, speed up critical processes, resulting in greater efficiency overall, simplify finding and linking related records and quality events, improve Corrective Action Preventive Action (CAPA) management, provide auditable assurance that regulatory requirements are met, and give stakeholders and authorized users better visibility into quality across the organization. In some embodiments, the QMS 126 may be a separate or distinct system from the DMS 118.

The content module 128 may include one or more caches, indexes, or containers for storing corporate documents and other content. For example, the content module 128 may include a repository of documents with text in one or more languages, each document may be indexed, for example, based on one or more criteria, for example, based on the one or more languages it includes text in. In some embodiments, one or more of the stored documents or data may relate to an Annual Product Quality Review (APQR) report. In embodiments, a content type may define how the content is stored in the content module 128. For example, business logic and methods, database structure, definitions (e.g., schema, field, table, etc.) and associated content of different content types may be stored in different manners, accordingly. Business logic and the methods of the module may be configured to act based on particular content items having been stored in the database (e.g., in the case of a particular visualizations or visualization data being stored in one or more aspects of the content module 128).

The rules management module 130 may administrate one or more Business rules for automatically generating local and/or global secondary indexes based on the specific needs of an organization or sub-organization (e.g., the group of users 110 or users 114). The Business rules may define how natural language is processed in order to generate the local and/or global secondary indexes. Accordingly, one or more natural language processing modules or natural language software may be stored in the rules management module 130.

The user profile module 132 may collect or receive user profile information from the various users of the systems. In some embodiments, the user profile information includes information about the user such as the user's department, the user's role (job function, etc.) within the department or larger organization as a whole, a current or typical location of the user, various certifications or accreditations of a user, or other information. In some embodiments, the user may update information associated with his or her profile individually. For example, a user may input his or her location, preferred language, department information, etc., when creating his or her own user profile (e.g., by selecting from amongst various selections in a drop down) or may assign one or more filters temporarily to his or her profile. For example, if a user knows that they require access to documents or data related to a certain topic at a particular permission level, the user could add such permission or request to add such permission to their profile subject to user admin approval and the permission could affect the Business rules associated with the user profile. User profile information may be collected and stored in a database, for example. The user profile module 132 may further include one or more aspects for managing user access permissions for example, the user profile module 132 may include one or more identity and access management (IAM) functions. The IAM functions could be enacted using, for example, a connection to one or more IAM databases (e.g., in the database(s) 124). The IAM function could be configured to communicate with other aspects of the system 100 using, for example, one or more connections via the network 102. The IAM function could use an IAM database to store, parse, categorize, or take other actions, for example, access rules, restriction requirements, management information, collected data, correlated data, predication data, behavioral information, and other suitable information, or any combination thereof. Further, the IAM function could dynamically restrict authorized users and access attempts if such users or access attempts occur when the IAM function may vulnerabilities or behaviors that are deemed hostile to the network 102. Accordingly, the IAM function and its use of tracking and monitoring behaviors over a long period of time could provide an added measure of security to any pre-defined policies followed by systems or subsystems communicatively coupled with the IAM function. In some embodiments, the IAM function may restrict access to particular data (e.g., data in a particular language, business analytics data, etc.) or documents or data based on, for example, a department of a user or other aspect of a user's profile.

The database 124 may be any type of database capable of storing data in one or more tables, for example, a NoSQL database. The database 124 may include one or more applications or interfaces which enable the creation, selection, import, etc. of database tables that can store and retrieve any data and serve various levels of request traffic. In some embodiments, the database 124 may include one or more applications for monitoring resource utilization and/or performance metrics associated with the database 124 such that users (e.g., an admin user) can monitor resource utilization and performance metrics. The database 124 may include one or more backup databases or archives (e.g., for regulatory compliance, etc.) and may provide convenient access to items in one or more tables by specifying primary key values and one or more secondary key values within the database. One or more secondary indexes may be created and scan and query requests may be issued against these one or more secondary indexes. A secondary index is a data structure that contains a subset of attributes from a table (e.g., a base table), along with an alternate key to support query operations. A user may be able to retrieve data from an index using a query. Each table may have multiple secondary indexes and these multiple secondary indexes, providing multiple secondary query patterns making search more efficient. In embodiments, each secondary index may be associated with one table, from which the secondary index may obtain its data (the "base table" for that secondary index). In some embodiments, when a user creates an index, if the user has sufficient permissions (as determined, for example, by the permissions stored in the user profile module 132) the user may define an alternate key for the index (partition key and sort key) and may define the attributes the user wants to be copied from the base table into the index. In some embodiments, the user may copy the attributes into the index or the attributes may be copied automatically based on one or more business rules (e.g., in the rules management module 130). The attributes may be copied along with the primary key attributes from the base table. The index may be queried or scanned similarly to how a table may be queried or scanned. In some embodiments, the system may automatically maintain every secondary index. For example, when adding, modifying, or deleting items in a base table, any indexes on that table may also be updated to reflect changes to the base table. As mentioned, the database 124 may further store one or more secondary indexes.

With continued reference to FIG. 1, the database 124 may support at least two types of secondary indexes: global secondary indexes and local secondary indexes. The global secondary index may be an index with a partition key and a sort key that can be different from those on the base table. The global secondary index may be considered "global" because queries on the index can span all of the data in the base table, across all partitions. A global secondary index may be stored, for example, in its own partition space away from the base table and may scale separately from the base table. The local secondary index may be, for example, an index with an equivalent partition key as the base table, but a different sort key. A local secondary index is "local" in the sense that every partition of a local secondary index is scoped to a base table partition that has the same partition key value.

In some embodiments, various criteria of the automatically selected and/or generated indexes may be automatically selected and/or generated for the index. Non-limiting examples of index criteria which may be automatically selected and/or generated include: the type of index to be created (e.g., global/local), the index name, key schema for the index, attributes from a base table, etc.

Figure 2:
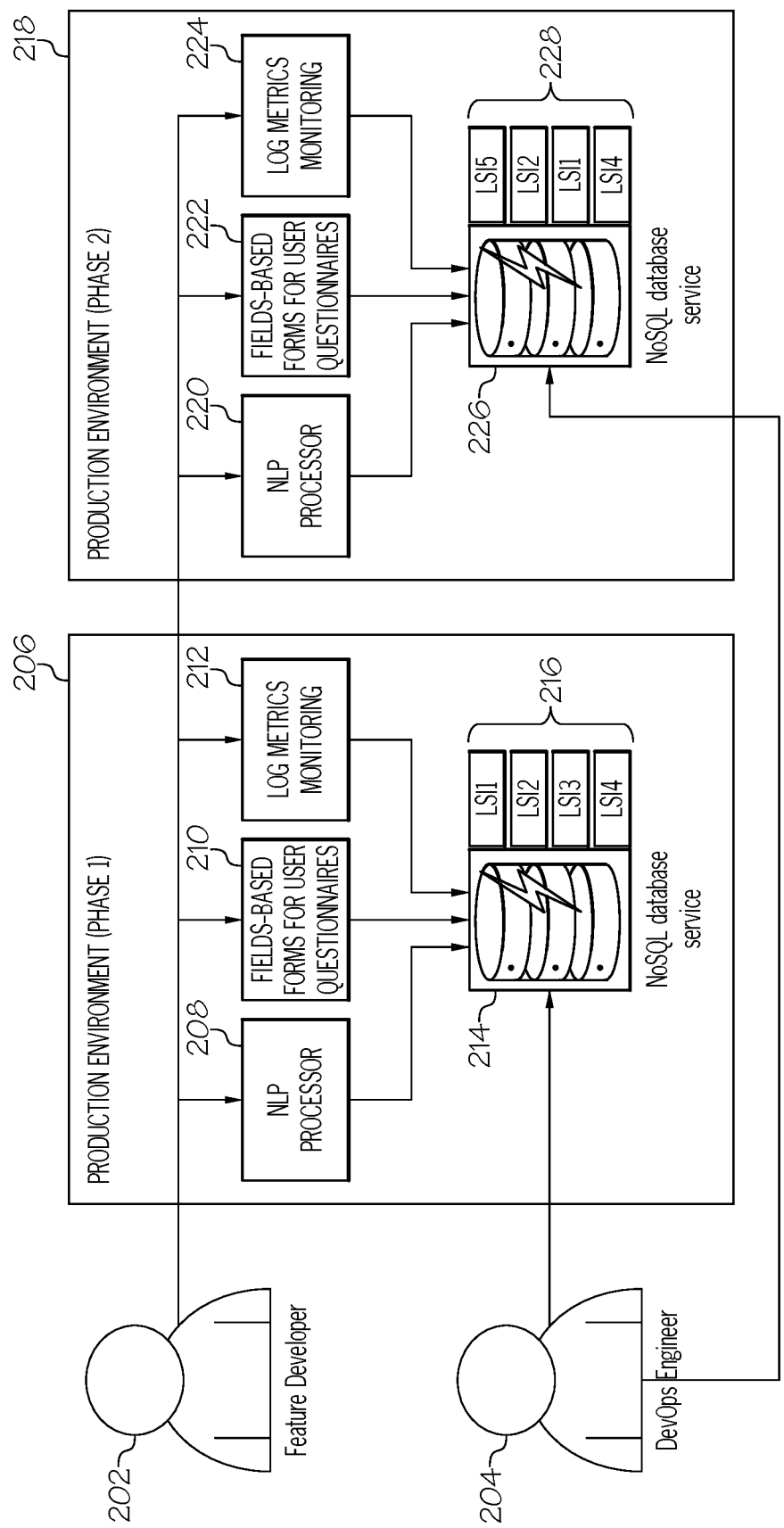
FIG. 2 further illustrates aspects of the exemplary environment of FIG. 1.

Referring to FIG. 2, an exemplary environment 200 for automatically generating one or more local and/or global secondary indexes is shown. The environment can be implemented using a system such as the system 100 of FIG. 1, for example. The environment can be accessed by one or more users such as, for example, a feature developer 202 and/or a development operations engineer 204. In some embodiments, the feature developer 202 may have access to various modules of the system, for example, a natural language processing module 208, 220, a fields-based forms module 210, 222, and a log metrics monitoring module 212, 224. The development operations engineer may have access to, for example, a NoSQL database service 214, 226 and one or more local secondary indexes 216, 228. In the particular embodiment shown, the feature developer 202 and the development operations engineer 204 may cause one or more local and/or global secondary indexes to be generated across multiple production environment phases. For example, a first production environment phase 206 and a second production environment phase 218.

The NLP processing module 208, 220 (or simply NLP module) may be capable of deriving and assigning context to data stored on the NoSQL database and/or other modules of the system in order to, for example, determine a natural language query and/or request and to return data that responds to the request. For example, an operator accessing the system can retrieve information from DMS 118 and its various subcomponents using natural language inquiries and requests, and receive results based on context of the request. The natural language inquiries can include an oral inquiry, as spoken by a user, as well as an inquiry that is typed or input into or received by a computing device. In some embodiments, the NLP module 208, 220 may receive natural language queries from the audible input device 142 (FIG. 1), for example, and convert them to a computer readable format. In some embodiments, one or more other modules of the system may convert the user inputs to a computer readable format before the data is received by the NLP module 208, 220. In some embodiments, the system may receive a natural language input in a textual format. For example, the system 100 may receive a text-based input using the hands-free input device 144 of FIG. 1 and/or a camera of one of the devices 116. Such text-based input can be converted from a visual signal to a computer readable signal and processed by the NLP module 208, 220. The NLP module 208, 220 may be configured to recognize and format raw speech and/or text using natural language processing techniques, such as deep learning techniques, text embeddings, machine translation, neural machine translation (NMT), recurrent neural network (RNN), long short-term memory (LTSM) networks, gated recurrent units (GRU), bidirectional encoder representations from transformers (BERT), generative pre-trained transformer (GPT), XLNET, and others.

In some embodiments, data may be entered into the database 214, 226 using one or more field-based forms 210, 222. Through these forms, the data may be parsed and organized on entry into its appropriate table. The forms may be in the format of, for example, one or ore user questionnaires, but the format is not limited thereto. The users entering data to the forms can be, for example, the users 110, 114 of the system 100. It is to be understood that field-based forms 210, 222 are merely one example of data entry and that data may be entered to the database using other methods.

In some embodiments, the manner in which the NoSQL database is accessed and used by users may be monitored, logged, and measured using, for example, the log metrics monitoring module 212, 224 (or just "monitoring module"). The monitoring module may log, for example, a number of parsing errors (e.g., parsing errors encountered while processing embedded metric format logs, etc.), a number of validation errors (e.g., validation errors encountered while processing embedded metric format logs, etc.), a number of API operations performed in an account (e.g., a number of API operations performed in an account that resulted in errors, etc.), a volume of log events (e.g., a volume of log events in compressed bytes forwarded to the subscription destination, etc.), and/or other information. The metrics recorded may correspond with, for example, service quotas (e.g., service quotas for using a database) and tracking such metrics may help manage quotas. Metrics tracked could include, for example, a number of specified operations performed with an account or group of accounts, a number of API operations performed in an account or group of accounts that resulted in errors, a number of API operations performed in an account or group of accounts that were throttled because of usage quotas, etc. Based on the metrics tracked with the log metrics monitoring module, the system may update the one or more local secondary indexes or cause the one or more local secondary indexes to be updated automatically.

The NoSQL database 214, 226 may be a database that uses a variety of data models for accessing and managing data stored therein. The NoSQL database may be optimized, for example, for applications requiring large data volume, low latency, and flexible data models. This optimization may be achieved, for instance, by easing some stringent requirements for data consistency. The NoSQL database 214, 226 may be one or more of a key-value, document, graph, in-memory, and/or search type database. The NoSQL database may relax some of the ACID (atomicity, consistency, isolation, durability) properties of relational databases for a more flexible database that can more easily scale horizontally. The NoSQL database may be partitionable because access patterns may be scalable using distributed architecture to increase throughput providing consistent performance. As demonstrated at FIG. 2, the NoSQL databases 214, 226 may have different LSIs or groups of LSIs from one phase to the next.

Referring now to FIG. 3, an exemplary base table 300 listing data is shown for the purposes of explanation of the systems and methods described herein. In FIG. 3, the base table 300 includes a forumname 302, a lastpostdatetime 304, a subject 306, and a number of replies 308. The forumname 302 may provide a name for a particular forum which may be a criteria for classifying data in the base table 300 based on a name of a forum in which one or more users are posting documents and/or other data. Similarly, the lastpostdatetime 304 may refer to a date and time of a most recent post within the particular forum. The subject 306 may refer to a subject of the discussion that is occurring within the form. The number of replies 308 may refer to the number of times a user or users have replied to an initial thread in the forum. The base table 300 shown in FIG. 3 is merely exemplary of tables which may be useful for organizing data and other systems and methods for organizing data, including tables such as that shown in FIG. 3 or not, are within the scope of this application. The base table 300 can be generated based on raw data received with the system 100 of FIG. 1 (e.g., through the DMS 118). The received raw data may have a plurality of attributes, which attributes can be described in metadata, which can be recorded in the base table 300. In some embodiments, in addition to the attributes shown, the attributes can include other non-limiting examples such as a document owner, a document organization, a document creation time, a document edit time, a document status, and a document format.

Accordingly, each of the columns in the base table 300 may be an attribute of the table and may be used to query the base table 300. The base table 300 may have a primary key and one or more secondary keys. The primary key may include a partition key and a sort key, which may each be attributes of the table. For example, the partition key may be the forumname 302 and the sort key may be the lastpostdatetime 304. To generate a local secondary index, the system may generate a key with the partition key (i.e., in this example, the forumname 302) and a local secondary index sort key (e.g., the subject 306 or the number of replies 308). This is, of course, merely exemplary and any combination of the attributes can be used as the partition key, sort key, and local secondary index keys. The attributes of FIG. 3 will be described in greater detail with respect to the methods described herein.

Figure 4:
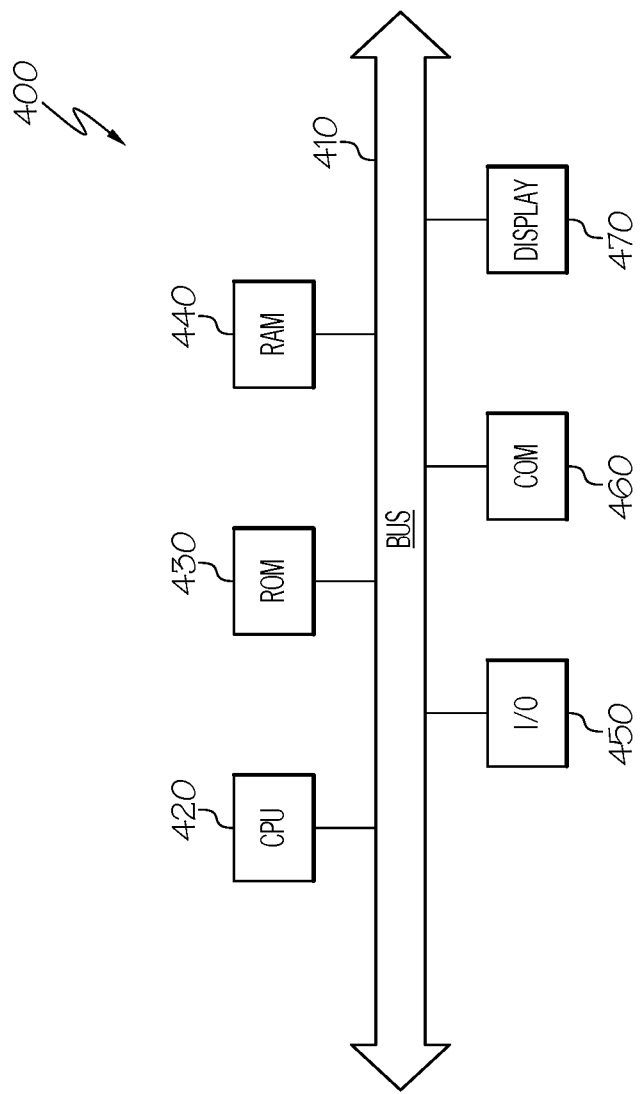
FIG. 4 illustrates an exemplary computing environment including a CPU and multiple storage devices.

FIG. 4 is a simplified functional block diagram of a computing system 400 that may be configured for carrying out one or more of the steps, programs, and/or executing techniques described herein, according to exemplary embodiments of the present disclosure. Specifically, in one embodiment, any of the modules of the system 100 may be an assembly of software and/or hardware including, for example, a data communication interface 460 for packet data communication. The platform may also include a central processing unit ("CPU") 420, in the form of one or more processors, for executing program instructions. The platform may include an internal communication bus 410, program storage, and data storage for various data files to be processed and/or communicated by the platform such as ROM 430 and RAM 440, although the system 400 may receive programming and data via network communications.

The system 400 also may include input and output ports 450 to connect with input and output devices such as keyboards, mice, touchscreens, monitors, displays, etc. The system 400 may include one or more displays, such as display 470, for displaying information. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 4 and the following discussion provide a brief, general description of one example of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 5:
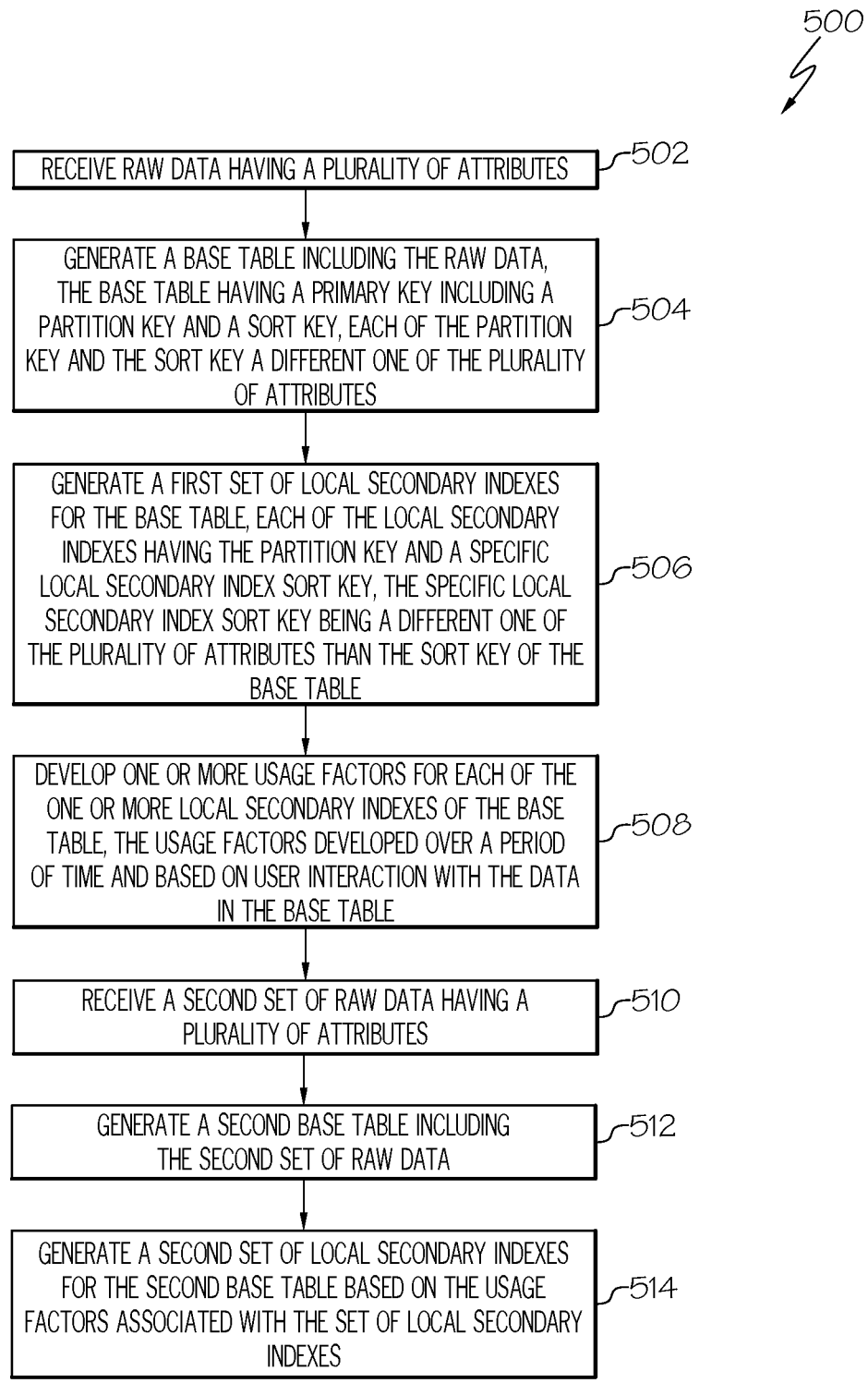
FIG. 5 is a flowchart depicting a method for automatically selecting and creating one or more local secondary indexes.

Referring to FIG. 5, a method 500 for generating one or more local secondary indexes using a plurality of data attributes is shown. The method 500 includes the various steps listed therein but it is to be understood that methods having fewer or more steps that that shown in FIG. 5 are contemplated herein.

At step 502, raw data having a plurality of attributes may be received. The raw data can come from one or more users of the system, such as, for example, users 110 and/or users 114. The data can relate to, for example, one or more portions of an APQR or similar report or may be any data or data type. As one example, the raw data may include the attributes shown in FIG. 3 discussed above. The raw data can be received at one or more of the devices 116 or another device connected to the network 102 and may be stored in the DMS 118, for example. In embodiments, the raw data can be stored as a base table.

Accordingly, at step 504, one or more base tables may be generated that includes the raw data generated at step 502. The base table can have a primary key, which primary key includes a partition key and a sort key, as discussed herein. Each of the partition key and the sort key may be a different one of the plurality of attributes. As one example, with reference to FIG. 3, the partition key could be the forumname 302 and the sort key could be the lastpostdatetime 304. A user may use the partition key and the sort key to form queries within the base table 300. Queries may be performed using, for example, any of the devices 116 connected to the network 102 and may be limited to the users with appropriate access permissions to access the network 102 and/or the DMS 118. The partition keys and sort keys may not provide an optimum set of keys for querying the data in any given base table, however, and so additional keys may be required.

At step 506, a first set of local secondary indexes for the base table may be generated. Each of the local secondary indexes may include the partition key and a specific local secondary index sort key. The specific local secondary index sort key being a different one of the plurality of attributes than the sort key of the base table. With continued reference to FIG. 3, the specific local secondary index sort key may be the subject 306, for example. Depending on the number of attributes of a base table, the local secondary index could be any combination of partition key and another attribute. Further, as time goes on (e.g., from a first operational phase to a second operational phase) the local secondary index may prove to not be the optimum index for querying the base table. Accordingly, it may become prudent to develop one or more additional local secondary indexes. The additional local secondary indexes can be determined, for example, based on one or more usage factors.

At step 508, one or more usage factors may be developed for each of the one or more local secondary indexes of the base table. In embodiments, the usage factors may be developed over a period of time and based on user interaction with the data in the base table. The usage factors may be used to determine, for example, which of the local secondary indexes, if any, are used for the given base tables or to determine which local secondary indexes may optimize query or a given base table. In some embodiments, the number of local secondary indexes may be limited (e.g., to four, five, six, etc. local secondary indexes), and hence, there may be one or more attributes of a base table which may be optimal to use as a secondary index which is not being used. In some embodiments, the usage factors may include a cost of a search. For instance, in some embodiments in which a queriable database is operated as a cloud service or external database that is searchable for a cost, the computing power required to conduct a search or query may be used to determine a cost of a search, especially with respect to a cost threshold value. In such cases, it will be beneficial to develop efficient search queries in order to reduce a cost of search. Accordingly, the cost of a search may be a usage factor for determining one or more additional local secondary indexes.

At step 510, a second set of raw data having a plurality of attributes may be received and a second base table including the second set of raw data may be developed at step 512. The second set of raw data may have the same or different attributes as the first set of raw data, but at least some of the second set of raw data will be related to the first set of raw data sufficiently such that determination of whether the application of one or more of the usage factors would be beneficial to the second set of raw data. As an example, the second set of raw data may have the same attributes as the first set of raw data, and in this case, the usage factors from the first set of raw data can be used to determine whether the local secondary indexes generated for the first base table will be beneficial to querying the data in the second base table.

Because the number of local secondary indexes may be limited and/or it may be resource intensive to generate local secondary indexes in addition to the partition key and the sort key, the usage factors associated with the first base table can be used to optimize querying functions in the second base table when selecting local secondary indexes for the second base table. For example, with reference to FIG. 3, if it is determined that a local secondary index using the forumname 302 as a primary key and the number of replies 308 as a secondary key is optimal to a local secondary index that uses the forumname 302 as a primary key and the subject 306 as a secondary key, it may be determined to generate a second set of local secondary indexes for the second base table based on the usage factors associated with the set of local secondary indexes at step 514 and/or to prioritize use of the forumname 302 and the number of replies 308 as a local secondary index over a local secondary index using the forumname 302 as a primary key and the number of replies 308 as a secondary key. Of course, both may be used as local secondary indexes if a sufficient number of local secondary indexes are permitted for the given system, with the priority of local secondary indexes as discussed above.

Figure 6:
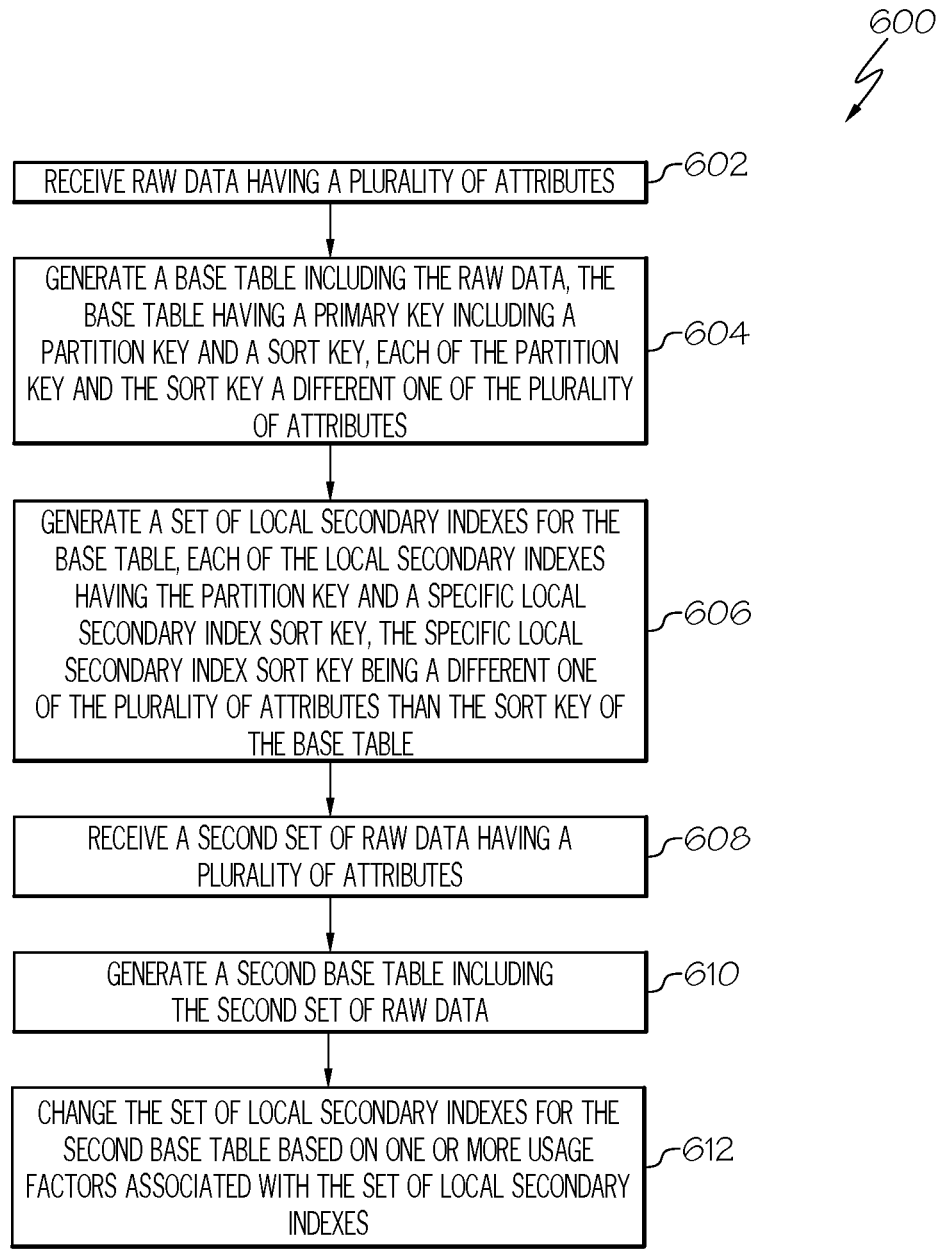
FIG. 6 is a second flowchart depicting a method for selecting and creating one or more local secondary indexes.

Referring to FIG. 6, another method 600 for updating one or more local secondary indexes based on usage factors is shown. The method 600 includes the various steps listed therein but it is to be understood that methods having fewer or more steps that that shown in FIG. 6 are contemplated herein.

At step 602, raw data having a plurality of attributes may be received. The attributes can be metadata related to raw data received in a document management system (e.g., the DMS 118 of FIG. 1), for example, and may be stored in a table (e.g., the table 300 of FIG. 3). In some embodiments, the raw data can relate to an annual report such as, for example, an annual product quality report (APQR). For instance, the raw data could refer to one or more quality events received by a tenant organization and may be received from a member of the organization (e.g., one of the users 110, 114 of FIG. 1). The user may have sufficient privileges to access the network 102 and upload data to the network 102 using one or more devices.

Once the raw data is captured and uploaded, it must be appropriately stored in a useful format and at step 604, a base table including the raw data may be generated. The base table may have or be assigned a primary key including a partition key and a sort key. The primary key can be assigned by default based on recognition of certain portions of the data (e.g., using a natural language processing application to recognize particular characters within the data, etc.) or based on some other criteria (e.g., all data tables generated by a particular organization use a default key, etc.) Each of the partition key and the sort key may have a different one of the plurality of attributes. For example, with reference to FIG. 3, the partition key may be a forum name and a sort key may be a last post date time. With the partition key and the sort key set, a user can query the table using the primary key (i.e., including the partition key and the sort key). A user may query the table using the primary key and may receive a search query result. However, such search result may not be most efficiently effected for each particular search, and accordingly a user may desire a local secondary index for the given table.

At step 606, a first set of local secondary indexes for the base table may be generated. Each of the local secondary indexes may have the partition key and a specific local secondary index sort key developed at step 604. In embodiments, the specific local secondary index sort key may be a different one of the plurality of attributes than the sort key of the base table. For example, with respect to FIG. 3, the specific local secondary index sort key may be the subject 306. Query or scan requests can be issued against the local secondary index sort key in order to most efficiently perform queries or scans of the base table. The first set of local secondary indexes may be sufficient for the purposes of some organizations or some queries, however, it may not necessarily optimize query or scan results in all use cases. Moreover, the number of local secondary indexes for a given table may be limited. Accordingly, one or more usage factors may be required in order to determine a most efficient local secondary indexes and additional local secondary indexes may be generated as explained in greater detail herein.

At step 608, one or more usage factors for each of the one or more local secondary indexes of the base table may be developed. The usage factors may be developed over a period of time and based on user interaction with the data in the base table. For example, the usage factors may be based on the nature of the interaction of the users with the data (e.g., based on the optimum query structure for a given table). The usage factors may be dynamic and may be based on the number of times a user queries for a particular datapoint. The usage factors may be developed, for example, using the log metrics monitoring module, which may track the interaction of the users with the table. In some embodiments, usage factors may be used to automatically recommend or automatically set a local secondary index for a given table.

In some embodiments, the usage factors may be based on, for example, an exhaustive list of all possible usage scenarios built by one or more users (e.g., a user admin) and the users themselves may manually select the most efficient criteria to use as the indexes for a given set of data (e.g., using a questionnaire or similar feature on a UI). In some embodiments, usage factors may be determine based on users typing free text (e.g., in a query or scan) and using NLP to determine how the query is intended to be used while importing documents (for example, "Our organization would like to import all documents between July 2021 and August 2022 for the author Ankit Singh that are in Approved status"). Such features could also be achieved through a more form fields-based approach (e.g., one or more drop downs). In some embodiments, usage factors may be determined based on a study of use logs on how the customer is currently using the database. For example, when a document import process is clicked, and there is currently only a single defined specific way to query data. In that case, software may query the table, and perform non optimized scan operations to get to the appropriate content instead of optimized queries. If there is a large number of such non optimized scan heavy operations, logs may indicate that the current way of selecting LSI's or GSI's (global secondary indexes) is inefficient and that it should be redefined.

Once a sufficient number of metrics are collected to develop usage factors the database may be reconstructed (e.g., at the end of a software release and different set of LSIs may be applied (e.g., to different tenants, portions of the organization, etc.)) and at step 610, a second set of raw data having a plurality of attributes may be determined, for example, the second set of raw data may be received over time and may populate one or more tables or databases within the DMS 118. The second set of raw data may be an update to and/or replacement of the first set of raw data. For example, the second set of raw data could be an updated set of data relating to a second round of clinical trials of a drug when the first set of raw data related to a first round of clinical trials of a drug. This is, of course, merely one example.

In some embodiments, the second set of raw data can be received after a period of time from the first set of raw data and after the period of time, a second base table can be created and one or more features of the base table can be determined. For example, the partition and sort keys of the second base table may be changed after the period of time based on usage factors determined. In some embodiments, the period of time can be based on, for example, a software update periodicity (e.g., a software update schedule). The period of time may be a set period of calendar days, months, years, etc. For example, the period of time may be four months.

The second base table can include attributes similar to the first base table and can be based on data received from the one or more users of the system. In embodiments, the second base table may include all of the attributes used as local secondary indexes for the first base table, but that is not required. At the time of the creation of the second base table, its features and attributes may be set, including, for example, the set of partition keys and sort keys that will make up its indexes. The second base table may have different or the same partition and sort keys as the first base table and before the partition and sort keys are set, the usage factors may be used to optimize the keys for the table.

Accordingly, at step 612, the set of local secondary indexes may be changed based on the usage factors associated with the set of local secondary indexes. The set of local secondary indexes may be updated to optimize the query and scan functions for the updated table based on the usage factors associated with the previous data.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method of querying a set of raw data using automatically generated local secondary indexes comprising:
   receiving, by one or more devices of a system, a first set of raw data having a plurality of attributes;
   generating, by a server of the system, a base table including the first set of raw data within the system, the base table having a primary key including a partition key and a sort key, each of the partition key and the sort key is a different one attribute of the plurality of attributes;
   automatically generating, by the server, a first set of local secondary indexes for the base table accessing various modules of the system, each local secondary index of the local secondary indexes having the partition key and a specific local secondary index sort key, the specific local secondary index sort key is a different one attribute of the plurality of attributes than the sort key of the base table;
   developing, by the server, one or more usage factors for each local secondary index of the local secondary indexes of the base table, the usage factors are developed over a period of time and are based on user interaction with the raw data in the base table, wherein the user interaction is one or more query structures provided by one or more users of the one or more devices;
   receiving, by the one or more devices, a second set of raw data having a plurality of attributes;
   generating, by the server, a second base table including the second set of raw data, wherein the second set of raw data is related to the first set of raw data, and wherein the second set of raw data is a subset of the first set of raw data; and
   changing, by the server, a second set of the local secondary indexes for the second base table based on the usage factors associated with the first set of the local secondary indexes, wherein the second set of the local secondary indexes is generated based on a cost of a search exceeding a threshold value.

2. The method of claim 1, wherein the second set of raw data includes the set of raw data and more contemporaneous data created after the set of raw data.

3. The method of claim 1, wherein the plurality of attributes includes one or more of a document owner, a document organization, a document creation time, a document edit time, a document status, and a document format.

4. The method of claim 1, wherein the period of time is based on a software update schedule.

5. The method of claim 1, wherein the usage factors include one or more search queries presented to a natural language processing application.

6. The method of claim 1, wherein the usage factors include a cost of a search of the raw data using the primary key and the first set of local secondary indexes.

7. The method of claim 1, wherein the second set of local secondary indexes is generated based on a set of tenant requirements.

8. The method of claim 7, wherein the tenant requirements include one or more optimized search parameters.

9. A method of creating a local secondary index based on usage factors comprising:

receiving, by one or more devices of a system, a first set of raw data having a plurality of attributes;
generating, by a server of the system, a base table including the first set of raw data within the system, the base table having a primary key including a partition key and a sort key, each of the partition key and the sort key is a different one attribute of the plurality of attributes;
automatically generating, by the server, a first set of local secondary indexes for the base table by accessing various modules of the system, each local secondary index of the local secondary indexes having the partition key and a specific local secondary index sort key, the specific local secondary index sort key is a different one attribute of the plurality of attributes than the sort key of the base table;
developing, by the server, one or more usage factors for each local secondary index of the local secondary indexes of the base table, the usage factors are developed over a period of time and are based on user interaction with the raw data in the base table, wherein the user interaction is one or more query structures provided by one or more users of the one or more devices;
receiving, by one or more devices, a second set of raw data having a plurality of attributes;
generating, by the server, a second base table including the second set of raw data, wherein the second set of raw data is related to the first set of raw data, and wherein the second set of raw data is a subset of the first set of raw data; and
changing, by the server, a second set of the local secondary indexes for the second base table based on the usage factors associated with the first set of the local secondary indexes, wherein the second set of the local secondary indexes is generated based on cost of a search exceeding a threshold value.

10. The method of claim 9, wherein the plurality of attributes includes one or more of a document owner, a document organization, a document creation time, a document edit time, a document status, and a document format.

11. The method of claim 9, wherein the period of time is based on a software update schedule.

12. The method of claim 9, wherein the period of time is four months.

13. The method of claim 9, wherein the local secondary indexes are determined based on natural language processing with a natural language processing module.

14. The method of claim 13, wherein the natural language processing includes one or more of deep learning techniques, text embeddings, machine translation, neural machine translation (NMT), recurrent neural network (RNN), long short-term memory (LTSM) networks, gated recurrent units (GRU), bidirectional encoder representations from transformers (BERT), and generative pre-trained transformer (GPT).

15. A system for generating and automatically updating local secondary indexes, the system comprising:
one or more devices; a processor; a server; and a memory communicatively coupled to the processor and including one or more non-transitory, processor-readable instructions, that when executed by the processor cause the system to:
receive, by the one or more devices of the system, a first set of raw data having a plurality of attributes;
generate, by the server of the system, a base table including the first set of raw data within the system, the base table having a primary key including a partition key and a sort key, each of the partition key and the sort key is a different one attribute of the plurality of attributes;
automatically generate, by the server, a first set of local secondary indexes for the base table by accessing various modules of the system, each local secondary index of the local secondary indexes having the partition key and a specific local secondary index sort key, the specific local secondary index sort key is a different one attribute of the plurality of attributes than the sort key of the base table;
develop, by the server, one or more usage factors for each local secondary index of the local secondary indexes of the base table, the usage factors are developed over a period of time and are based on user interaction with the raw data in the base table, wherein the user interaction is one or more query structures provided by one or more users of the one or more devices;
receive, by the one or more devices, a second set of raw data having a plurality of attributes;
generate, by the server, a second base table including the second set of raw data, wherein the second set of raw data is related to the first set of raw data, and wherein the second set of raw data is a subset of the first set of raw data; and
change, by the server, a second set of the local secondary indexes for the second base table based on the usage factors associated with the first set of the local secondary indexes, wherein the second set of the local secondary indexes is generated based on cost of a search exceeding a threshold value.

16. The system of claim 15, wherein the second set of raw data includes the first set of raw data and more contemporaneous data created after the first set of raw data.

17. The system of claim 15, wherein the usage factors include a cost of a search of the raw data using the primary key and the first set of local secondary indexes.

* * * * *